Figure 6:
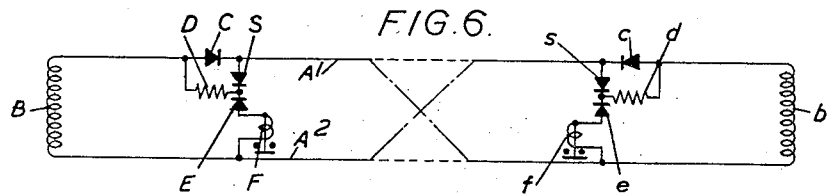

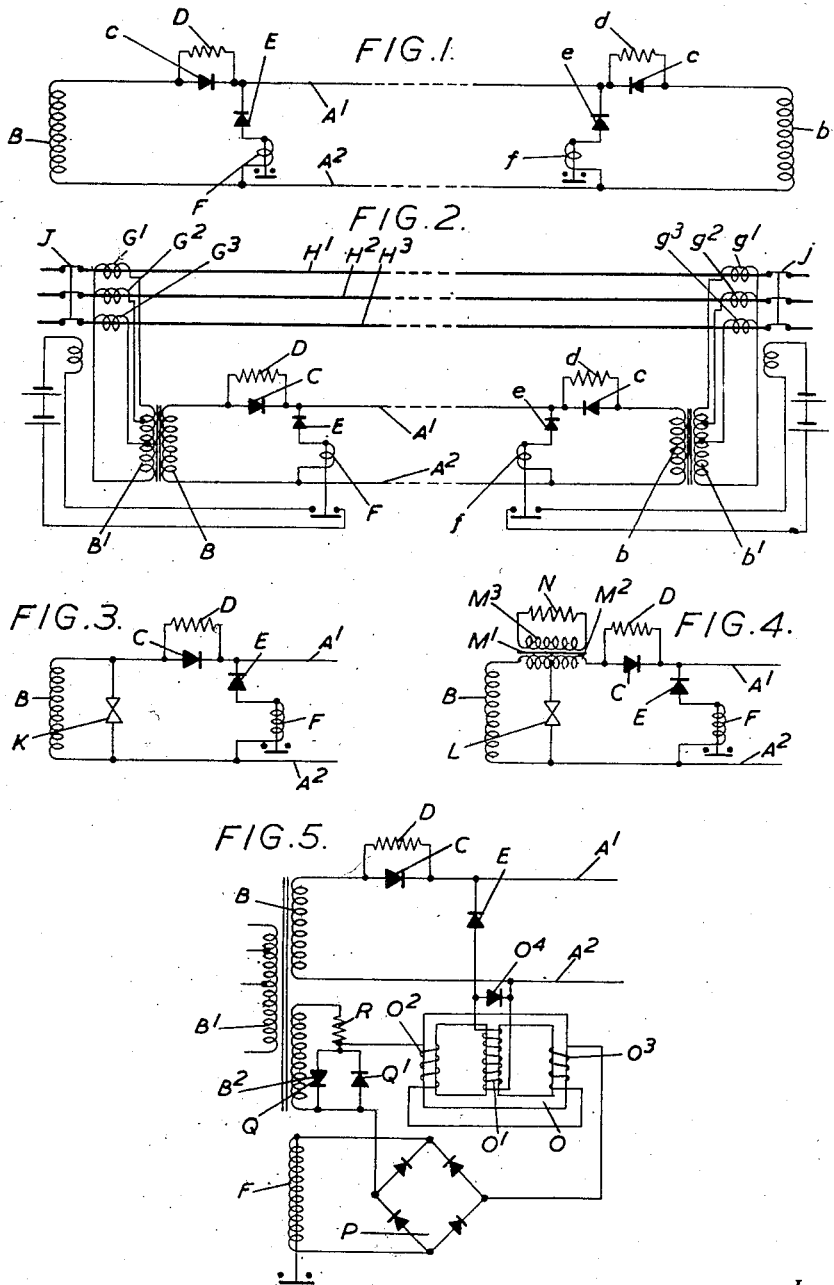

Inventor
John B. Patrickson
By
Holcombe, Wetherill & Brisebois
Attorney

United States Patent Office 2,777,093
Patented Jan. 8, 1957

2,777,093

ELECTRIC PILOT WIRE CIRCUIT ARRANGEMENTS FOR PROTECTIVE OR OTHER PURPOSES

John Brian Patrickson, Newcastle-on-Tyne, England, assignor to A. Reyrolle & Company Limited, Hebburn-on-Tyne, England, a company of Great Britain Application February 10, 1953, Serial No. 336,148

Claims priority, application Great Britain February 18, 1952

22 Claims. (Cl. 317—28)

This invention relates to an electric pilot wire circuit arrangement and, although applicable to other purposes, is more especially intended for use in an electric protective arrangement for the protection of a feeder or other main electric circuit.

It is frequently desired to utilise, for the protection of a feeder, pilot wires of the type employed in post office telephone circuits in Great Britain. Such wires have a relatively high loop resistance and high mutual electrostatic capacity, and the maximum permissible voltage between the two wires of a pair is of the order of a hundred volts. It will be apparent that with these characteristics these wires are not very satisfactorily suited to the conditions which ordinarily arise in the pilot circuits of Merz-Price and other protective arrangements.

The primary object of the present invention is therefore to provide a circuit arrangement which, whilst adequately capable of meeting protective requirements, is yet suited to the characteristics of pilot wires of the telephone type and can also be employed with pilot wires of the type ordinarily used for protective purposes.

The pilot wire circuit arrangement according to the invention comprises a pair of pilot wires energised from a voltage source at each end, two opposed rectifiers one at each end in series with the pilot circuit, a resistance in a shunt circuit across each of such series rectifiers, a shunt rectifier at each end connected in a shunt circuit across the pilot wires on the pilot wire side of the associated series rectifier, and means at each end responsive to the flow of current through one of the two rectifiers. The resistance shunted across the series rectifier at each end preferably has a value not less than that of the resistance of the pilot wires.

In order to guard against risk of wrong operation resulting from inadvertent crossing of the two pilot wires, it is sometimes convenient to provide an additional rectifier at each end, connected in a lead which forms part of and is common to the two shunt circuits respectively containing the resistance and the shunt rectifier, the sense of such additional rectifier being opposed to that of the shunt rectifier.

The current-responsive means at each end may take various forms to suit the purpose for which it is required. In one simple arrangement such means consists of a D. C. relay in series with the shunt rectifier. In an alternative arrangement, such means comprises a voltage-operated transductor having a control winding in series with the shunt rectifier and a suitably energised A. C. operating winding, and a relay in series with such operating winding. The transductor may be of the kind having an auxiliary rectifier shunted across its control winding in a sense opposite to that of the shunt rectifier.

When this arrangement is utilised for protective purposes, the voltage source at each end conveniently consists of a current transformer energised in accordance with the current flow conditions in the protected main circuit.

In such case, when the current-responsive means comprises a transductor, the A. C. operating winding thereof may conveniently be energised from an auxiliary secondary winding on the current transformer whose main secondary winding energises the pilot circuit, or from the secondary winding of a separate current transformer energised in accordance with the current flow conditions in the protected circuit. In either case means are preferably provided for limiting the voltage applied to the relay and the operating winding of the tranductor. Such voltage-limiting device may comprise a pair of rectifiers connected in parallel in opposite senses and shunted across the relay and the transductor operating winding, the whole being energised in series with a resistance from the secondary winding.

Means are also preferably provided for limiting the voltage applied to the pilot circuit from the current transformer main secondary winding. Such means may comprise a non-linear impedance connected across the main secondary winding, or alternatively a voltage-limiting device of the kind comprising a non-linear impedance and a linear impedance, which are in series across the main secondary winding and are so connected to the pilot circuit that opposed voltages obtained from the two impedances are applied to such circuit. Conveniently, one of the two impedances is connected on one side to one end of the main secondary winding and on the other side to the junction point of two windings connected respectively to the other end of the main secondary winding and to the pilot circuit, such two windings together constituting a transformer having a third winding loaded by the other impedance.

As an example of the use of the invention for purposes other than protection may be mentioned the measurement of the phase-angle between two voltages of equal amplitude, one at each end of the pilot circuit, when the current-responsive means at each end will consist of a meter in series with the shunt rectifier.

Figure 7:
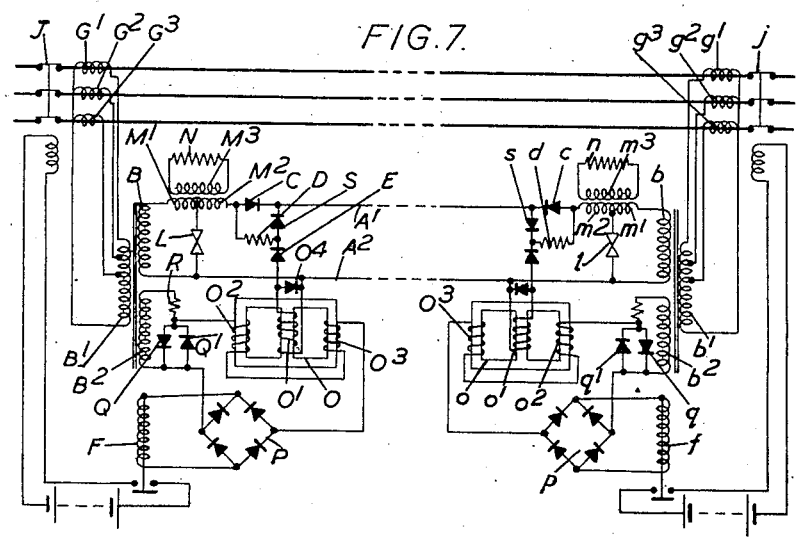
Figure 8:
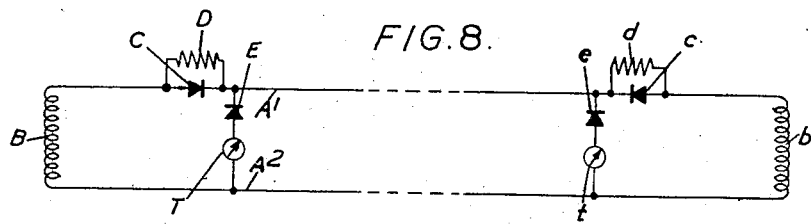

The invention may be carried into practice in various ways, but some convenient alternative arrangements according thereto are illustrated by way of example in the accompanying drawings, in which Figure 1 illustrates the basic pilot wire circuit arrangement according to the invention in its simplest form, Figure 2 shows the application of this simple circuit to a protective arrangement of the Merz-Price type for a three-phase feeder, Figures 3 and 4 respectively show two alternative arrangements for limiting the voltage applied to the pilot circuit, Figure 5 shows a further modification in which the relay is energised through a transductor, Figure 6 illustrates the provision of means for reducing risk of inadvertent operation if the pilot wires should happen to be cross-connected, Figure 7 shows a preferred protective arrangement, and Figure 8 illustrates an application of the pilot wire circuit arrangement according to the invention to measurement of the phase angle between the voltage sources at the two ends of the pilot circuit.

The simple basic arrangement shown in Figure 1 comprises two pilot wires $A^1$, $A^2$, which may for instance consist of a telephone pair, and a local circuit at each end. Such local circuit comprises a source of A. C. voltage B or $b$, shown by way of example as a transformer secondary winding, a half-wave rectifier C or $c$ shunted by a resistance D or $d$ and connected in series between one side of the source B or $b$ and one of the pilot wires $A^1$, and a shunt circuit connected at one end to the junction point of the series rectifier C or $c$ and the first pilot wire $A^1$ and at the other end to the junction point of the second pilot wire $A^2$ and the other side of the source B or $b$, such shunt circuit including in series a half-wave rectifier E or $e$ and a simple D. C. relay F or $f$. The two series rectifiers C, $c$, one at each end of the first pilot wire $A^1$, are connected in opposition to one another, and in the local circuit at each end the series rectifier C (or $c$) and the shunt rectifier E (or $e$) are connected in opposition to one another. The two voltage sources B, $b$ are so connected to the circuit that, when in phase with one another, they would (if it were not for the rectifiers) assist one another in causing current to circulate around the pilot circuit. The value of the shunt resistance D or $d$ at each end is not less than the total resistance of the two pilot wires $A^1$ and $A^2$.

The operation of the circuit in various circumstances will now be described, and for this purpose it will be convenient in description to refer to one end as the home end and the other end as the remote end.

Taking first the case when the two sources B and $b$ are in phase with one another, the direction of current flow during one half-cycle is such as to be permitted by the series rectifier C at the home end. Thus during this half-cycle the shunt resistance D at the home end is short-circuited by the series rectifier C, whilst at the remote end the series rectifier $c$ opposes current flow, and the current can therefore flow through the shunt resistance $d$. No current flows through the shunt rectifier circuit E, F at the home end during this half-cycle since the potential difference across it is opposed to the sense of the rectifier E. At the remote end, however, the potential difference across the shunt rectifier circuit $e$, $f$ depends upon the relative values of the remote shunt resistance $d$ and the pilot wire resistance, through which the current is circulating. If these two resistances are equal, the two ends of the remote shunt rectifier circuit $e$, $f$ will be equipotential points and no current will flow through such circuit. Current could only flow through the remote shunt rectifier $e$ during this half-cycle, if the pilot resistance were greater than the shunt resistance $d$. By making the shunt resistance $d$ greater than the pilot resistance, the flow of current through the remote shunt rectifier $e$ is more certainly prevented and increased stability ensured. Thus during this half-cycle no current flows through either of the relays F or $f$, and this is equally true during the other half-cycle, when the conditions at the home and remote ends are reversed.

In this description, it has been assumed that the voltages of the two sources B, $b$ are of equal magnitude, but the increased stability, mentioned above, due to making the shunt resistances D, $d$ each greater than the pilot resistance, ensures that there will still be no current flow through either relay F or $f$ when the two voltages differ from one another by an amount dependent on the difference between either shunt resistance and the pilot resistance.

Turning now to the case when the two voltages are equal but 180° out of phase, the two series rectifiers C, $c$ will oppose current flow during one half-cycle, and current can therefore flow through the local circuits (each including the shunt resistance D or $d$ and the shunt rectifier E or $e$) at both ends, no current however flowing through the pilot wires $A^1$, $A^2$ since the two voltages are equal and opposite. During the other half-cycle, the series rectifiers C and $c$ will short-circuit the shunt resistances D and $d$ at both ends, and the shunt rectifiers E and $e$ will oppose current flow through the shunt circuits. Since the voltages are balanced no current will flow at all during this half-cycle. Thus, when the two voltages are in antiphase, current will flow through the relays F and $f$ at both ends during alternate half-cycles. When the two voltages are unequal and in anti-phase, the same conditions apply, but the magnitudes of the currents through the two relays will be different.

When the two voltages differ in phase by an angle other than 180°, the magnitudes of the currents flowing through the two relays will be a function of the relative phase angle.

In the case when one of the two voltages (say $b$ at the remote end) is cut out together, current will flow during one half-cycle through the home shunt resistance D and the home shunt rectifier E, whilst during the other half-cycle current will flow through the home series rectifier C and the pilot $A^1$, $A^2$ and the remote shunt resistance $d$ but no current will flow through either shunt rectifier E or $e$. Thus in this case, current will flow through the relay F at the home end during the alternative half-cycles, but not at all through the remote relay $f$.

It will be clear that the simple basic arrangement above described is eminently suitable for use in a protective arrangement of the Merz-Price current-balance type, in which case the voltage source at each end will consist (as indicated in Figure 2) of the secondary winding B or $b$ of a summation transformer having a tapped primary winding $B^1$ or $b^1$ so energised from current transformers $G^1$, $G^2$, $G^3$ or $g^1$, $g^2$, $g^3$ on the three phases $H^1$, $H^2$, $H^3$ of the protected main circuit as to give a secondary output for all types of fault on the main circuit, the relay F or $f$ at each end controlling the tripping of a circuit-breaker J or $j$ at the adjacent end of the main circuit in the usual manner. The three conditions described above for the simple basic circuit then correspond respectively to the cases of a fault external to the protected feeder section, as internal fault fed from both ends of the section, and an internal fault fed from one end only, the relays operating to cut out the feeder (at both ends or at the feeding end) in the last two cases but remaining stable in the case of an external fault. The relays F, $f$ used can be D. C. relays, since they are energized by unidirectional pulsating current.

It is particularly to be noted that the risk of inadvertent operation due to the effects of capacity currents between the pilot wires $A^1$ and $A^2$ is very greatly reduced by the arrangement according to the invention, and this is an important factor in permitting the use of a post office telephone pair to constitute the pilot circuit.

Another important advantage of the invention in this respect is that it permits a Merz-Price current-balance protective arrangement to operate satisfactorily with only two pilot wires instead of the usual three, since in effect it provides pairs of equipotential points at both ends of the pilot circuit, in place of the usual single pair of equipotential points at opposite ends which necessitates the third pilot wire to provide the connection.

It is usually desirable, when using a telephone pair for the pilot wires, to provide means for limiting the voltage applied to the pilot circuit. This may be effective, for example, as shown in Figure 3, by providing a non-linear resistance K across the transformer secondary winding B. Preferably, however, a voltage-limiting network is employed, comprising a non-linear impedance and a linear impedance, which are in series across the secondary winding B and are so connected to the pilot circuit $A^1$, $A^2$ that opposed voltages obtained from the two impedances are applied to such circuit. In one such arrangement, shown in Figure 4, a non-linear impedance L is connected on one side to one end of the transformer secondary winding B and on the other side to the junction point between two windings $M^1$, $M^2$, one of which is connected to the other end of the transformer secondary winding B, whilst the other is connected to the series rectifier C and shunt resistance D, these two windings $M^1$, $M^2$ together constituting a transformer having a third winding $M^3$ loaded by a linear resistance N.

Whilst a simple D. C. relay in the shunt rectifier circuit is sufficient to meet the requirements of such a protective arrangement, it is sometimes preferable to provide means for isolating the relay from the pilot circuit. This can be effected by the use of a transductor of the voltage-operated type, and this also makes it possible, if need be, to amplify the current for operation of the tripping relay.

In one example of such modification, shown in Figure 5, the transductor comprises a three-limbed core O having a D. C. control winding $O^1$ on its centre limb and an A. C. operating winding in two series-connected halves $O^2$, $O^3$ respectively on the two outer limbs. The D. C. control winding $O^1$ is connected in series with the shunt rectifier E, and the relay F is connected through a full-wave bridge rectifier P in series with the A. C. operating winding $O^2$, $O^3$ in a circuit fed from a suitable A. C. source, which may be derived through a summation transformer from current transformers on the main protected circuit. In the example illustrated, the same summation transformer $B^1$, B as is used to supply the pilot circuit $A^1$, $A^2$ is employed for this purpose by means of an additional secondary winding $B^2$. It is usually desirable in such case to provide a voltage-limiting device to ensure that excessive voltages are not applied to the transductor during the flow of heavy fault currents on the main circuit, and in the example shown such voltage-limiting is obtained by the use of two parallel-connected opposed rectifiers Q, $Q^1$ shunted across the relay F and transductor operating winding $O^2$, $O^3$, the whole being connected in series with a resistance R across the additional secondary winding $B^2$. It is preferable to connect an auxiliary rectifier $O^4$ across the transductor control winding $O^1$, as shown.

When using a telephone pair for the pilot wires $A^1$, $A^2$, there is occasionally some risk that the two wires of the pair might inadvertently be cross-connected, which would of course gives rise to wrong operation of the arrangement. It is preferred, therefore, to make the arrangement such as to minimise risk of wrong operation if the wires should happen to be cross-connected. This can readily be achieved by the provision of an additional rectifier at each end, as shown in Figure 6, wherein the wrong cross-connection of the pilot wires is indicated in chain line in contrast with the correct connection shown in dotted line. This additional rectifier S or s is connected in series in a lead which is common to the shunt rectifier circuit and the shunt resistance circuit, so that it forms part of both shunt circuits, the sense of this rectifier being opposed to that of the shunt rectifier E or e. It can be shown that this additional rectifier does not affect the operation of the arrangement when the two pilot wires $A^1$, $A^2$ are correctly connected, whilst when they are cross-connected the operating current which would wrongly flow through the relay F or f is reduced in value, owing to the fact that it also has to flow through the shunt resistance D or d, thereby greatly reducing the risk of wrong operation.

A complete preferred protective arrangement, incorporating the modifications described with reference to Figures 4, 5 and 6, is illustrated in Figure 7, and the operation of this arrangement will be clear without further description.

Although the pilot circuit arrangement according to the invention is primarily intended for use in a Merz-Price protective arrangement in the manner above described, it can also be used for other purposes. One example of such alternative use is for the measurement of the phase angle between two voltage sources of equal magnitude, one at each end of a long pilot circuit, when it is desired to indicate the measurement simultaneously at both ends. In such case, the arrangement will generally follow the lines above described for protective purposes, with the exception that the D. C. relay F or f at each end is replaced by a meter T or t, as shown by way of example for the simple basic arrangement in Figure 8. It can be shown that, when the current flowing through each meter T or t is plotted against the phase angle to be measured, the resultant curve is of periodic wave-form, somewhat resembling a sine wave, the current being zero when the phase angle is 180° and a maximum when the phase angle is zero. The arrangement according to the invention is especially advantageous for such measurement, since the zero value of current is independent of pilot capacitance.

What I claim as my invention and desire to secure by Letters Patent is:

1. An electric pilot wire circuit arrangement, comprising a pair of pilot wires, a voltage source at each end for energising the pilot wires, two opposed rectifiers one at each end in series with the pilot circuit, a shunt circuit incorporating a resistance across each of such series rectifiers, a shunt circuit at each end incorporating a shunt rectifier across the pilot wires on the pilot wire side of the associated series rectifier, such shunt rectifier being connected in the shunt circuit in a sense opposed to that of the adjacent series rectifier, and means at each end responsive to the flow of current through the shunt rectifier.

2. An electric pilot wire circuit arrangement as claimed in claim 1, in which the resistance shunted across the series rectifier at each end has a value not less than that of the resistance of the pilot wires.

3. An electric pilot wire circuit arrangement as claimed in claim 2, in which the current-responsive means at each end comprises a D. C. relay device in series with the shunt rectifier.

4. An electric pilot wire circuit arrangement as claimed in claim 1, in which the current-responsive means at each end comprises a D. C. relay device in series with the shunt rectifier.

5. An electric pilot wire circuit arrangement as claimed in claim 1, in which the current-responsive means at each end comprises a relay, and a voltage-operated transductor having a control winding in series with the shunt rectifier and an operating winding in series with the relay energised with alternating current.

6. An electric pilot wire circuit arrangement as claimed in claim 5, having an auxiliary rectifier connected across the control winding of the transductor in a sense opposite to that of the shunt rectifier.

7. An electric pilot wire circuit arrangement, comprising a pair of pilot wires, a voltage source at each end for energising the pilot wires, two opposed rectifiers one at each end in series with the pilot circuit, a shunt circuit at each end across the pilot wires on the pilot wire side of the associated series rectifier such shunt circuit including in series a shunt rectifier opposed to the adjacent series rectifier and an additional rectifier opposed to the shunt rectifier, a further shunt circuit at each end across the series rectifier such shunt circuit including a resistance and having a part in common with the first shunt circuit such part comprising the additional rectifier, and means at each end responsive to the flow of current through the shunt rectifier.

8. An electric pilot wire circuit arrangement as claimed in claim 7, in which the current-responsive means at each end comprises a relay, and a voltage-operated transductor having a control winding in series with the shunt rectifier and an operating winding in series with the relay energized with alternating current.

9. An electric protective arrangement, comprising a current-transforming device at each end of the main circuit to be protected having a secondary winding from which a voltage representative of the current-flow conditions in the main circuit can be taken, a pilot circuit consisting of a pair of pilot wires energised at its ends from such current transformer secondary windings, two opposed rectifiers one at each end in series with the pilot circuit, a shunt circuit incorporating a resistance across each of such series rectifiers, a shunt circuit at each end incorporating a shunt rectifier across the pilot circuit on the pilot wire side of the associated series rectifier, such shunt rectifier being connected in the shunt circuit in a sense opposed to that of the adjacent series rectifier, and means at each end responsive to the flow of current through the shunt rectifier for tripping out the protected main circuit in the event of a fault on such circuit.

10. An electric protective arrangement as claimed in claim 9, in which the current-responsive means at each end comprises a D. C. relay device in series with the shunt rectifier.

11. An electric protective arrangement as claimed in claim 10, in which the two shunt circuits have a part in common, such part including an additional rectifier whose sense is opposed to that of the shunt rectifier.

12. An electric protective arrangement as claimed in claim 9, in which the resistance shunted across the series rectifier at each end has a value not less than that of the resistance of the pilot wires.

13. An electric protective arrangement as claimed in claim 9, having means at each end for limiting the voltage applied to the pilot circuit from the current transformer secondary winding.

14. An electric protective arrangement as claimed in claim 13, in which the voltage-limiting means comprises a non-linear impedance and a linear impedance energised in series from the secondary winding, and means whereby two opposed voltages obtained from such two impedances are applied in series to the pilot circuit.

15. An electric protective arrangement, comprising a current-transforming device at each end of the main circuit to be protected having a secondary winding from which a voltage representative of the current-flow conditions in the main circuit can be taken, a pilot circuit consisting of a pair of pilot wires energised at its ends from such current transformer secondary windings, two opposed rectifiers one at each end in series with the pilot circuit, a shunt circuit incorporating a resistance across each of such series rectifiers, a shunt circuit at each end incorporating a shunt rectifier across the pilot circuit on the pilot wire side of the associated series rectifier, a voltage-operated transductor at each end having a control winding in series with the shunt rectifier and an A. C. operating winding, means for energising such operating windings by an alternating voltage derived from the main protected circuit, a relay at each end in series with such operating winding, and means whereby the relays control the tripping of the main protected circuit.

16. An electric protective arrangement as claimed in claim 15, having means at each end for limiting the voltage applied to the relay and the transductor operating winding.

17. An electric protective arrangement as claimed in claim 16, in which the voltage-limiting means comprises a pair of rectifiers connected in parallel in opposite senses and shunted across the series-connected relay and operating winding, and a resistance in series with the energising circuit for such rectifiers.

18. An electric protective arrangement as claimed in claim 15, having means at each end for limiting the voltage applied to the pilot circuit from the current transformer secondary winding.

19. An electric protective arrangement as claimed in claim 15, having an auxiliary rectifier connected across the control winding of the transductor in a sense opposite to that of the shunt rectifier.

20. A phase-angle measuring arrangement for measuring the phase angle between two sources of voltage of equal amplitude, comprising a pair of pilot wires energised at their ends from such voltage sources, two opposed rectifiers one at each end in series with the pilot circuit, a shunt circuit incorporating a resistance across each of such series rectifiers, a shunt circuit at each end incorporating a shunt rectifier across the pilot wires on the pilot-wire side of the associated series rectifier, such shunt rectifier being connected in the shunt circuit in a sense opposed to that of the adjacent series; and a meter at each end in series with the shunt rectifier.

21. A phase-angle measuring arrangement as claimed in claim 20, in which the resistance shunted across the series rectifier at each end has a value not less than that of the resistance of the pilot wires.

22. A phase-angle measuring arrangement as claimed in claim 20, in which the two shunt circuits have a part in common, such part including an additional rectifier whose sense is opposed to that of the shunt rectifier.

References Cited in the file of this patent

UNITED STATES PATENTS

| | | |
|---|---|---|
| 1,325,889 | Curtis | Dec. 23, 1919 |
| 1,745,690 | Pritchett | Feb. 4, 1930 |
| 1,779,724 | Beard | Oct. 28, 1930 |
| 2,246,324 | Schroder | June 17, 1941 |
| 2,523,148 | Schaelchlin | Sept. 19, 1950 |
| 2,696,573 | Patrickson et al. | Dec. 7, 1954 |

FOREIGN PATENTS

| | | |
|---|---|---|
| 167,797 | Austria | Feb. 26, 1951 |
| 626,633 | Great Britain | July 19, 1949 |